US007054401B2

(12) United States Patent
Kada et al.

(10) Patent No.: US 7,054,401 B2
(45) Date of Patent: May 30, 2006

(54) PARALLEL SIGNAL TRANSMISSION DEVICE

(75) Inventors: Kazuhisa Kada, Yokohama (JP); Hiroyuki Shimono, Yokohama (JP); Teruhiko Suzuki, Kawasaki (JP); Shuji Miyake, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1016 days.

(21) Appl. No.: 10/033,505

(22) Filed: Dec. 27, 2001

(65) Prior Publication Data

US 2003/0007549 A1 Jan. 9, 2003

(30) Foreign Application Priority Data

Jul. 5, 2001 (JP) ....................................... 2001-205116

(51) Int. Cl.
*H04L 7/00* (2006.01)

(52) U.S. Cl. ....................................................... 375/355

(58) Field of Classification Search ................. 375/260, 375/354, 371, 365, 368, 224, 226, 286, 288, 375/293, 294, 316, 337; 370/464, 503
See application file for complete search history.

(56) References Cited

U.S. PATENT DOCUMENTS

| | | | | |
|---|---|---|---|---|
| 5,157,530 A | * 10/1992 | Loeb et al. | 398/79 |
| 6,275,880 B1 | * 8/2001 | Quinlan et al. | 710/100 |
| 6,667,993 B1 | * 12/2003 | Lippett et al. | 370/509 |
| 6,735,397 B1 | * 5/2004 | Herrity | 398/158 |
| 6,819,683 B1 | * 11/2004 | Jones et al. | 370/506 |
| 2002/0009169 A1 | * 1/2002 | Watanabe | 375/371 |

* cited by examiner

*Primary Examiner*—Stephen Chin
*Assistant Examiner*—Freshteh Aghdam
(74) *Attorney, Agent, or Firm*—Katten Muchin Rosenman LLP

(57) ABSTRACT

In a parallel signal transmission device for converting serial signals into parallel signals at a transmitting unit to be transmitted to a receiving unit, the transmitting unit generates serial code signals from periodically latched parallel signals besides transmitted parallel signals, and adjusts phases of the parallel signals to the serial code signals by delaying the parallel signals by a predetermined delay time; and the receiving unit changes over bits of the parallel signals from the transmitting unit based on recovered clocks, detects bit shift amounts of the parallel signals after bit changeover, and performs skew adjustments of the parallel signals depending on the bit shift amounts.

12 Claims, 16 Drawing Sheets

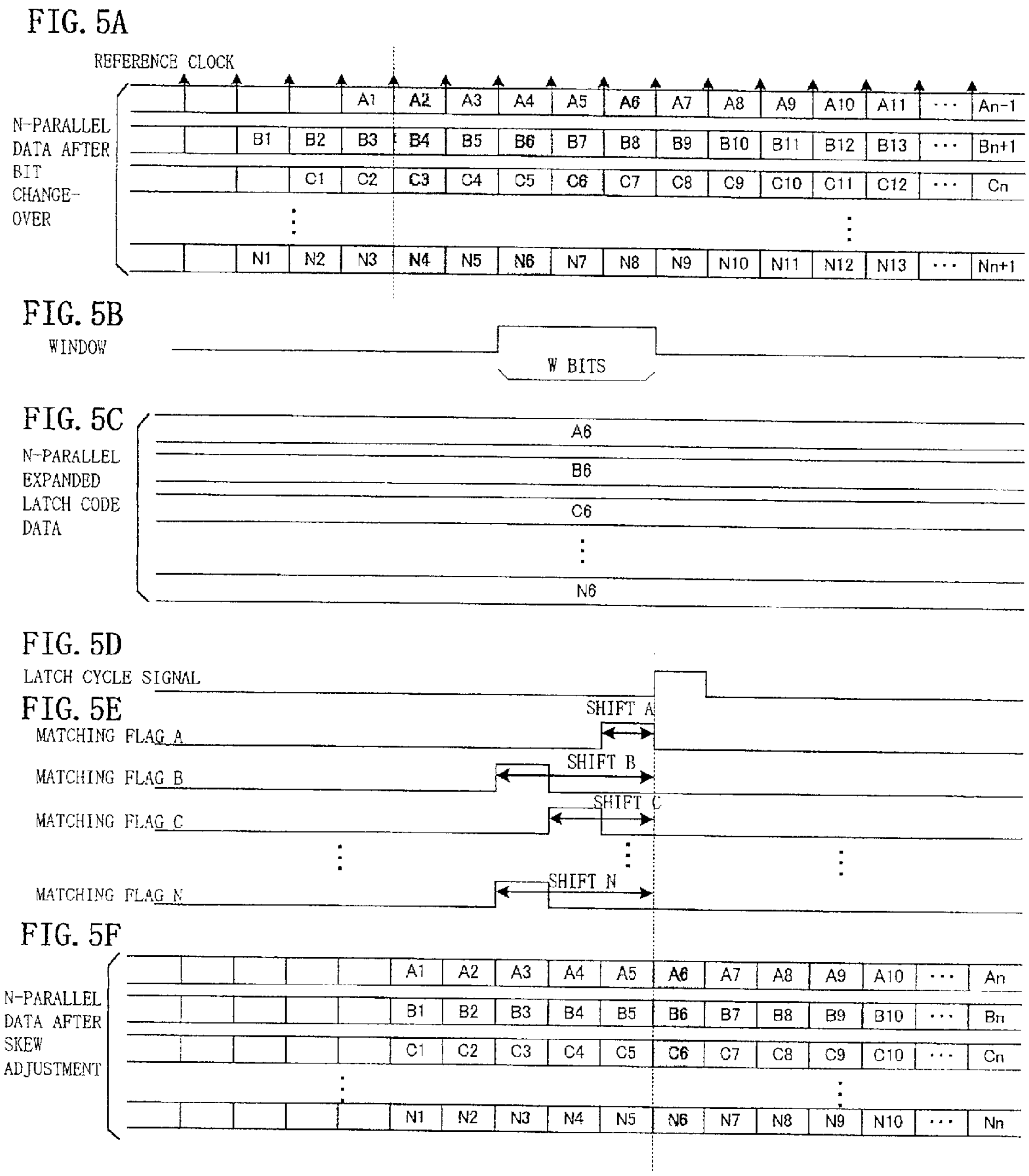
FIG. 5A
REFERENCE CLOCK
N-PARALLEL DATA AFTER BIT CHANGE-OVER
A1 A2 A3 A4 A5 A6 A7 A8 A9 A10 A11 ··· An-1
B1 B2 B3 B4 B5 B6 B7 B8 B9 B10 B11 B12 B13 ··· Bn+1
C1 C2 C3 C4 C5 C6 C7 C8 C9 C10 C11 C12 ··· Cn
N1 N2 N3 N4 N5 N6 N7 N8 N9 N10 N11 N12 N13 ··· Nn+1
FIG. 5B
WINDOW
W BITS
FIG. 5C
N-PARALLEL EXPANDED LATCH CODE DATA
A6
B6
C6
N6
FIG. 5D
LATCH CYCLE SIGNAL
FIG. 5E
MATCHING FLAG A
SHIFT A
MATCHING FLAG B
SHIFT B
MATCHING FLAG C
SHIFT C
MATCHING FLAG N
SHIFT N
FIG. 5F
N-PARALLEL DATA AFTER SKEW ADJUSTMENT
A1 A2 A3 A4 A5 A6 A7 A8 A9 A10 ··· An
B1 B2 B3 B4 B5 B6 B7 B8 B9 B10 ··· Bn
C1 C2 C3 C4 C5 C6 C7 C8 C9 C10 ··· Cn
N1 N2 N3 N4 N5 N6 N7 N8 N9 N10 ··· Nn

8-PARALLEL DATA (BEFORE SCRAMBLE)

8-PARALLEL DATA (AFTER SCRAMBLE)

SERIAL LATCH CODE DATA (TRANSMITTING SIDE)
LATCH
(RECEPTION)

8-PARALLEL DATA (AFTER BIT CHANGEOVER)

SERIAL LATCH CODE DATA (RECEIVING SIDE)
DETECT BIT SHIFT BY SERIAL LATCH CODE DATA

8-PARALLEL DATA (AFTER SKEW ADJUSTMENT)

8-PARALLEL DATA (AFTER DESCRAMBLE)
※ ( ):SCRAMBLED DATA

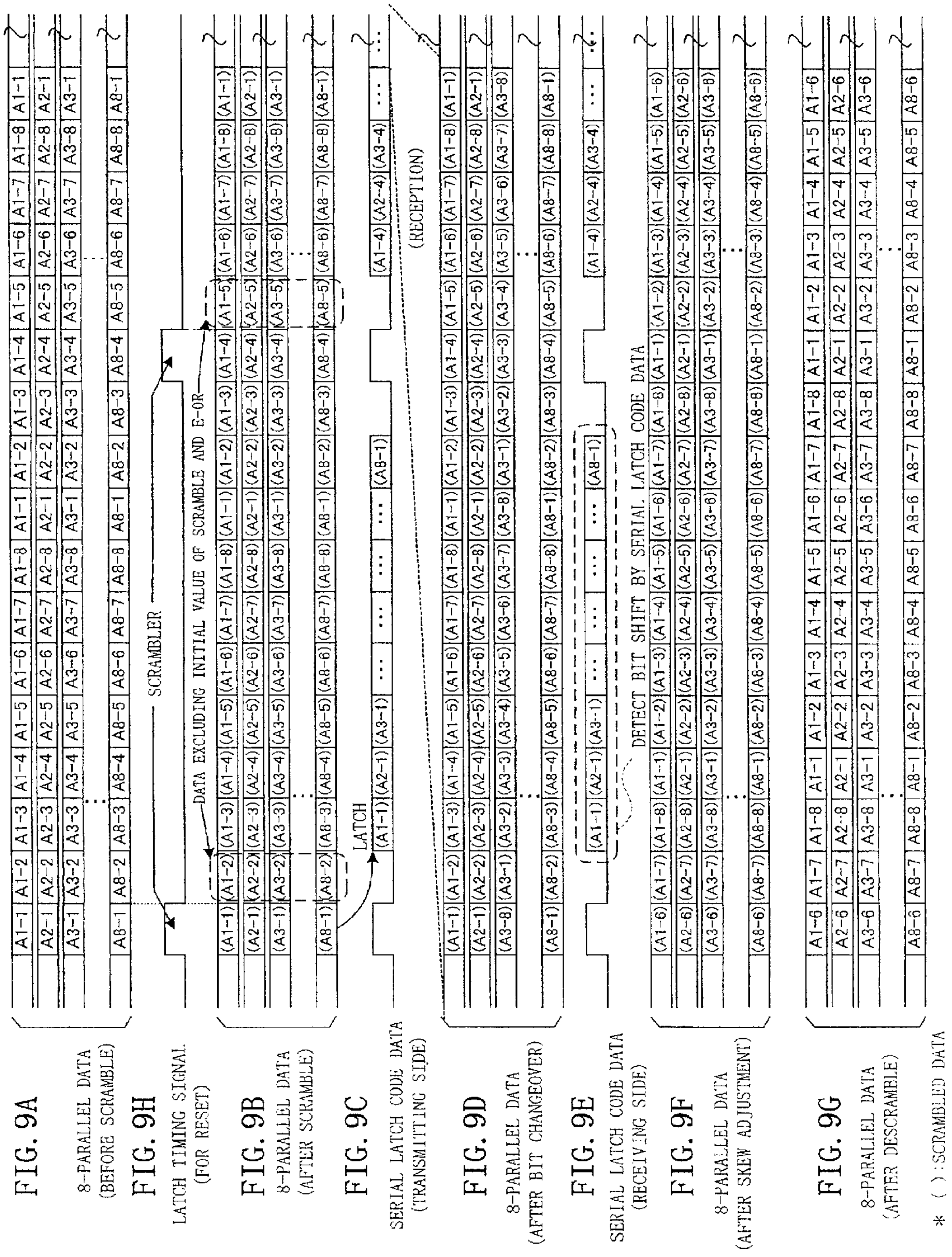
FIG. 9A
8-PARALLEL DATA (BEFORE SCRAMBLE)
FIG. 9H
LATCH TIMING SIGNAL (FOR RESET)
SCRAMBLER
FIG. 9B
8-PARALLEL DATA (AFTER SCRAMBLE)
DATA EXCLUDING INITIAL VALUE OF SCRAMBLE AND E-OR
LATCH
FIG. 9C
SERIAL LATCH CODE DATA (TRANSMITTING SIDE)
(RECEPTION)
FIG. 9D
8-PARALLEL DATA (AFTER BIT CHANGEOVER)
FIG. 9E
SERIAL LATCH CODE DATA (RECEIVING SIDE)
DETECT BIT SHIFT BY SERIAL LATCH CODE DATA
FIG. 9F
8-PARALLEL DATA (AFTER SKEW ADJUSTMENT)
FIG. 9G
8-PARALLEL DATA (AFTER DESCRAMBLE)
* ( ):SCRAMBLED DATA

5-PARALLEL DATA

SERIAL LATCH CODE DATA
(TRANSMITTING SIDE)
LATCH
(RECEPTION)

5-PARALLEL DATA
(AFTER BIT CHANGEOVER)

SERIAL LATCH CODE DATA
(RECEIVING SIDE)
DETECT BIT SHIFT BY SERIAL LATCH CODE DATA

5-PARALLEL DATA
(AFTER SKEW ADJUSTMENT)

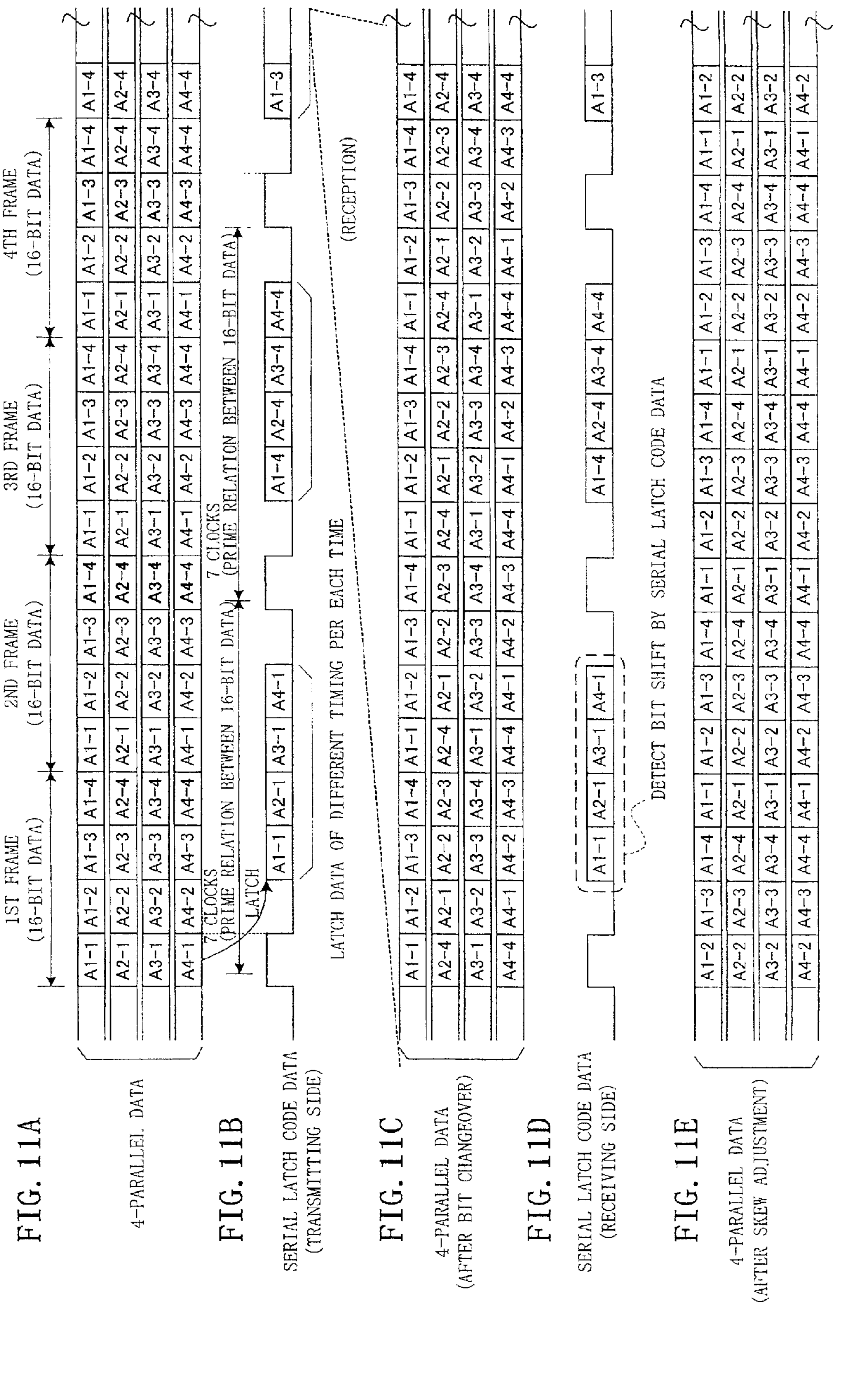
FIG. 11A
4-PARALLEL DATA
1ST FRAME (16-BIT DATA)
2ND FRAME (16-BIT DATA)
3RD FRAME (16-BIT DATA)
4TH FRAME (16-BIT DATA)
FIG. 11B
SERIAL LATCH CODE DATA (TRANSMITTING SIDE)
LATCH
7 CLOCKS (PRIME RELATION BETWEEN 16-BIT DATA)
LATCH DATA OF DIFFERENT TIMING PER EACH TIME
(RECEPTION)
FIG. 11C
4-PARALLEL DATA (AFTER BIT CHANGEOVER)
FIG. 11D
SERIAL LATCH CODE DATA (RECEIVING SIDE)
DETECT BIT SHIFT BY SERIAL LATCH CODE DATA
FIG. 11E
4-PARALLEL DATA (AFTER SKEW ADJUSTMENT)

FIG. 14A

16-PARALLEL LATCH DATA (2.5G[Hz])

| | | | | | | | | | | | | | | | | | | | | | | | | | | |
|---|---|---|---|---|---|---|---|---|---|---|---|---|---|---|---|---|---|---|---|---|---|---|---|---|---|---|
| A5 | A6 | A7 | A8 | A9 | A10 | A11 | A12 | A13 | A14 | A15 | A16 | A17 | A18 | A19 | A20 | A21 | A22 | A23 | A24 | A25 | A26 | A27 | A28 | A29 | A30 | A31 |
| B5 | B6 | B7 | B8 | B9 | B10 | B11 | B12 | B13 | B14 | B15 | B16 | B17 | B18 | B19 | B20 | B21 | B22 | B23 | B24 | B25 | B26 | B27 | B28 | B29 | B30 | B31 |
| C5 | C6 | C7 | C8 | C9 | C10 | C11 | C12 | C13 | C14 | C15 | C16 | C17 | C18 | C19 | C20 | C21 | C22 | C23 | C24 | C25 | C26 | C27 | C28 | C29 | C30 | C31 |
| D5 | D6 | D7 | D8 | D9 | D10 | D11 | D12 | D13 | D14 | D15 | D16 | D17 | D18 | D19 | D20 | D21 | D22 | D23 | D24 | D25 | D26 | D27 | D28 | D29 | D30 | D31 |
| E5 | E6 | E7 | E8 | E9 | E10 | E11 | E12 | E13 | E14 | E15 | E16 | E17 | E18 | E19 | E20 | E21 | E22 | E23 | E24 | E25 | E26 | E27 | E28 | E29 | E30 | E31 |
| F5 | F6 | F7 | F8 | F9 | F10 | F11 | F12 | F13 | F14 | F15 | F16 | F17 | F18 | F19 | F20 | F21 | F22 | F23 | F24 | F25 | F26 | F27 | F28 | F29 | F30 | F31 |
| G5 | G6 | G7 | G8 | G9 | G10 | G11 | G12 | G13 | G14 | G15 | G16 | G17 | G18 | G19 | G20 | G21 | G22 | G23 | G24 | G25 | G26 | G27 | G28 | G29 | G30 | G31 |
| H5 | H6 | H7 | H8 | H9 | H10 | H11 | H12 | H13 | H14 | H15 | H16 | H17 | H18 | H19 | H20 | H21 | H22 | H23 | H24 | H25 | H26 | H27 | H28 | H29 | H30 | H31 |
| I5 | I6 | I7 | I8 | I9 | I10 | I11 | I12 | I13 | I14 | I15 | I16 | I17 | I18 | I19 | I20 | I21 | I22 | I23 | I24 | I25 | I26 | I27 | I28 | I29 | I30 | I31 |
| J5 | J6 | J7 | J8 | J9 | J10 | J11 | J12 | J13 | J14 | J15 | J16 | J17 | J18 | J19 | J20 | J21 | J22 | J23 | J24 | J25 | J26 | J27 | J28 | J29 | J30 | J31 |
| K5 | K6 | K7 | K8 | K9 | K10 | K11 | K12 | K13 | K14 | K15 | K16 | K17 | K18 | K19 | K20 | K21 | K22 | K23 | K24 | K25 | K26 | K27 | K28 | K29 | K30 | K31 |
| L5 | L6 | L7 | L8 | L9 | L10 | L11 | L12 | L13 | L14 | L15 | L16 | L17 | L18 | L19 | L20 | L21 | L22 | L23 | L24 | L25 | L26 | L27 | L28 | L29 | L30 | L31 |
| M5 | M6 | M7 | M8 | M9 | M10 | M11 | M12 | M13 | M14 | M15 | M16 | M17 | M18 | M19 | M20 | M21 | M22 | M23 | M24 | M25 | M26 | M27 | M28 | M29 | M30 | M31 |
| N5 | N6 | N7 | N8 | N9 | N10 | N11 | N12 | N13 | N14 | N15 | N16 | N17 | N18 | N19 | N20 | N21 | N22 | N23 | N24 | N25 | N26 | N27 | N28 | N29 | N30 | N31 |
| O5 | O6 | O7 | O8 | O9 | O10 | O11 | O12 | O13 | O14 | O15 | O16 | O17 | O18 | O19 | O20 | O21 | O22 | O23 | O24 | O25 | O26 | O27 | O28 | O29 | O30 | O31 |
| P5 | P6 | P7 | P8 | P9 | P10 | P11 | P12 | P13 | P14 | P15 | P16 | P17 | P18 | P19 | P20 | P21 | P22 | P23 | P24 | P25 | P26 | P27 | P28 | P29 | P30 | P31 |

FIG. 14B

SAMPLING CYCLE

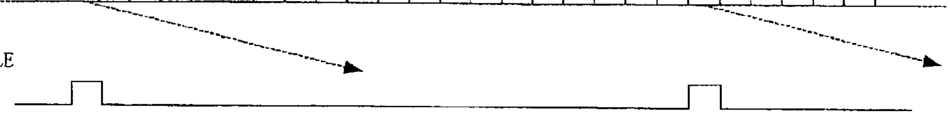

FIG. 14C

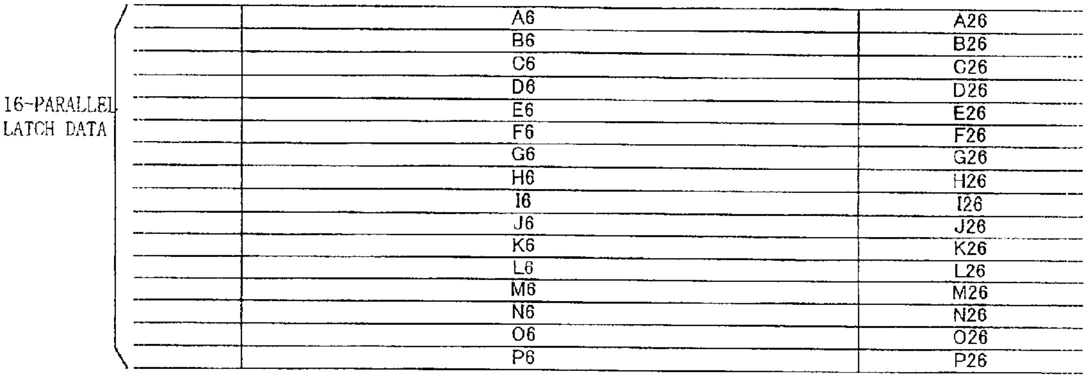

FIG. 14D

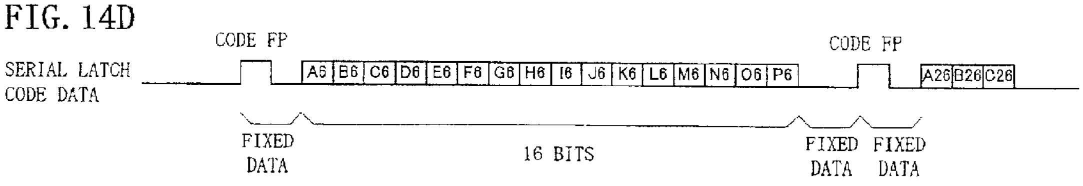

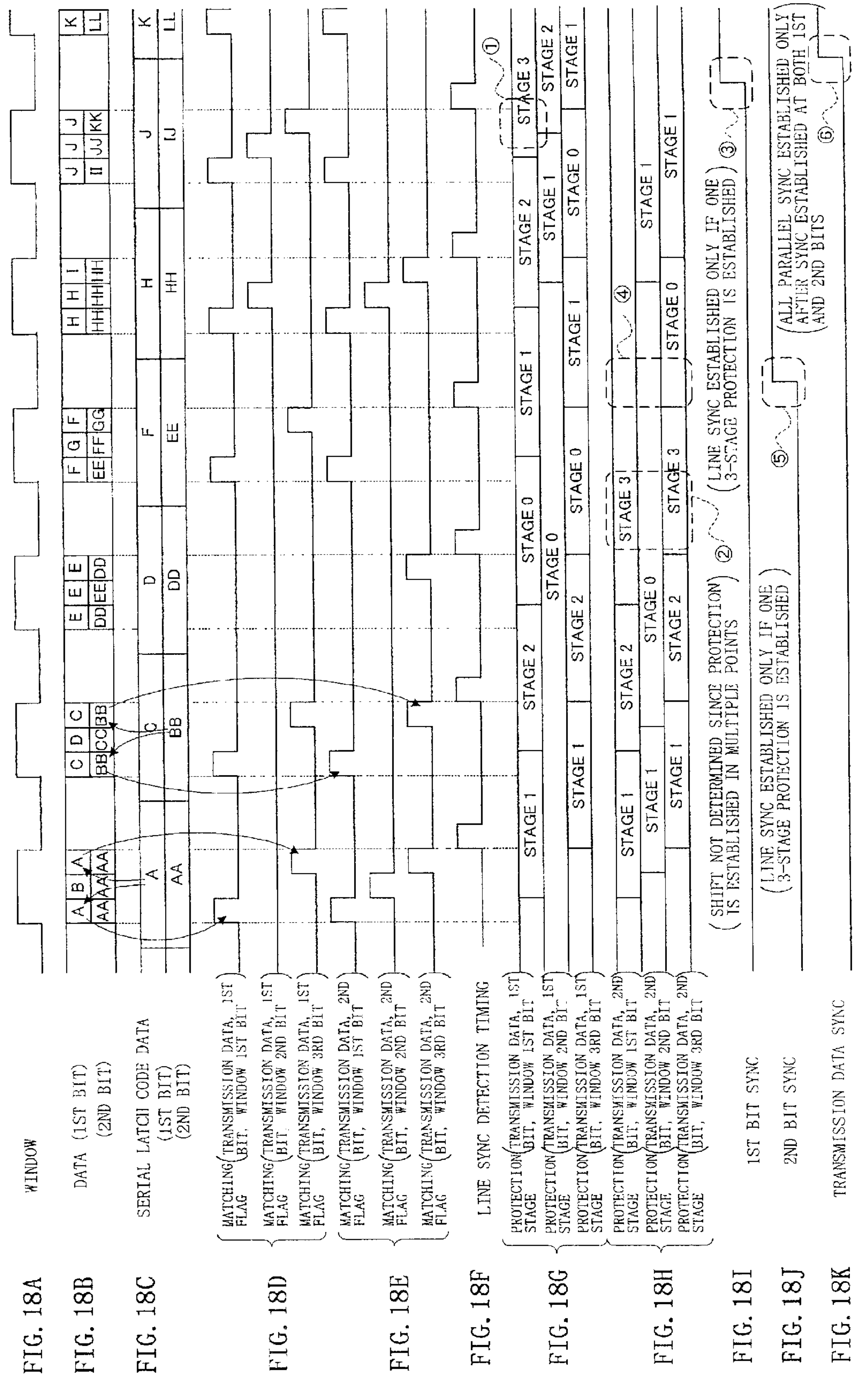
FIG. 18A WINDOW
FIG. 18B DATA (1ST BIT) (2ND BIT)
FIG. 18C SERIAL LATCH CODE DATA (1ST BIT) (2ND BIT)
FIG. 18D MATCHING FLAG (TRANSMISSION DATA, 1ST BIT, WINDOW 1ST BIT)
MATCHING FLAG (TRANSMISSION DATA, 1ST BIT, WINDOW 2ND BIT)
MATCHING FLAG (TRANSMISSION DATA, 1ST BIT, WINDOW 3RD BIT)
FIG. 18E MATCHING FLAG (TRANSMISSION DATA, 2ND BIT, WINDOW 1ST BIT)
MATCHING FLAG (TRANSMISSION DATA, 2ND BIT, WINDOW 2ND BIT)
MATCHING FLAG (TRANSMISSION DATA, 2ND BIT, WINDOW 3RD BIT)
FIG. 18F LINE SYNC DETECTION TIMING
FIG. 18G PROTECTION STAGE (TRANSMISSION DATA, 1ST BIT, WINDOW 1ST BIT)
PROTECTION STAGE (TRANSMISSION DATA, 1ST BIT, WINDOW 2ND BIT)
PROTECTION STAGE (TRANSMISSION DATA, 1ST BIT, WINDOW 3RD BIT)
FIG. 18H PROTECTION STAGE (TRANSMISSION DATA, 2ND BIT, WINDOW 1ST BIT)
PROTECTION STAGE (TRANSMISSION DATA, 2ND BIT, WINDOW 2ND BIT)
PROTECTION STAGE (TRANSMISSION DATA, 2ND BIT, WINDOW 3RD BIT)
FIG. 18I 1ST BIT SYNC
FIG. 18J 2ND BIT SYNC
FIG. 18K TRANSMISSION DATA SYNC
STAGE 0
STAGE 1
STAGE 2
STAGE 3
(SHIFT NOT DETERMINED SINCE PROTECTION IS ESTABLISHED IN MULTIPLE POINTS) ②
(LINE SYNC ESTABLISHED ONLY IF ONE 3-STAGE PROTECTION IS ESTABLISHED) ③
(LINE SYNC ESTABLISHED ONLY IF ONE 3-STAGE PROTECTION IS ESTABLISHED) ⑤
(ALL PARALLEL SYNC ESTABLISHED ONLY AFTER SYNC ESTABLISHED AT BOTH 1ST AND 2ND BITS) ⑥
①
④

PARALLEL SIGNAL TRANSMISSION DEVICE

BACKGROUND OF THE INVENTION

1. Field of the Invention

The present invention relates to a parallel signal transmission device, and in particular to a parallel signal transmission device converting serial signals into parallel signals at a transmitting unit to be transmitted to a receiving unit.

When parallel signals converted from serial signals are transmitted from a transmitting unit to a receiving unit using a plurality of signal lines, the receiving unit cannot perform a normal parallel signal processing due to skews, i.e. dispersion of data phases, generated on individual signal lines. Therefore, some skew adjustments (phase adjustments) are required.

2. Description of the Related Art

In a prior art transmission device using parallel signal lines, the period of transmission data is long enough compared to generated skews. Therefore, there has been adopted a technique of providing a simple delay circuit between the transmitting unit and the receiving unit for the adjustments, or lowering the transmission speed itself.

However, with a technological leap advance in recent years, ultrahigh-speed/high-capacity signal transmission has been made possible. For example, in an integrated circuit (IC), the period of parallel transmission data has been extremely shortened, so that the proportion of skew to the data period is increased, and the parallel data along time axis are misaligned in phase, thereby causing a problem that a normal processing cannot be performed.

SUMMARY OF THE INVENTION

It is accordingly an object of the present invention to provide a parallel signal transmission device for converting serial signals into parallel signals at a transmitting unit to be transmitted to a receiving unit, wherein skews along time axis are adjusted which have been difficult to be controlled with a simple delay circuit.

In order to achieve the above-mentioned object, a parallel signal transmission device according to the present invention (1), as schematically shown in FIG. 1, comprises: a transmitting unit 1 provided with a latch 12 for periodically latching parallel signals besides the parallel signals outputted from a serial-parallel converter (S/P) 11, a latch code signal generator 13, as an example of a code signal generator, for generating serial code signals including synchronizing signals from the signals latched at the latch 12, and a fixed delay portion 14 for adjusting phases of the parallel signals to the serial code signals by delaying the parallel signals by a predetermined delay time; and a receiving unit 3 provided with a clock recovery portion 31 of the parallel signals and the serial code signals, a bit changeover portion 32 for changing over bits of the parallel signals and the serial code signals based on clocks recovered by the clock recovery portion 31, a bit shift detector 33 for detecting bit shift amounts of the parallel signals outputted from the bit changeover portion 32 based on the serial code signals, and a variable delay portion 34 for performing skew adjustments of the parallel signals outputted from the bit changeover portion 32 depending on the bit shift amounts.

Hereinafter, the operation of the present invention (1) will be described referring to time charts shown in FIGS. 2A, 2B, 3A–3D, 4A, 4B, and 5A–5F.

Firstly, ultrahigh-speed serial signals (frequency P [Hz]) shown in FIG. 2A inputted to the transmitting unit 1 are converted into data of a parallel number "N" (hereinafter, occasionally referred to as N-parallel data or N-parallel signals) as shown in FIG. 2B at the serial-parallel converter (S/P) 11 to be transmitted to the latch 12 and the fixed delay portion 14.

Such N-parallel signals are periodically sampled at the latch 12. Namely, the N-parallel signals shown in FIG. 2B, also shown in FIG. 3A, are converted by the latch 12 into N-parallel latch signals at a sampling period shown in FIG. 3B.

Such N-parallel latch signals are converted by the latch code generator 13 into the serial code signals such as serial latch code signals (see FIG. 3D) having a frame signal FP of the sampling period shown in FIG. 3B to be outputted to the receiving unit 3 through a transmission line 2. It is to be noted that the serial latch code signals are outputted in a form, as shown in FIG. 3D, where fixed data including the frame signal FP are inserted on both sides of the data of the serial signals converted from the N-parallel latch signals shown in FIG. 3C.

The parallel signals outputted from the serial-parallel converter 11 are provided with a predetermined delay time by the fixed delay portion 14, for performing phase adjustments between the N-parallel signals outputted to the receiving unit 3 and the serial latch code signals outputted from the latch code generator 13, and are transmitted to the receiving unit 3 through the transmission line 2. The predetermined delay time will be described later.

In the receiving unit 3, the N-parallel signals (frequency P/N [Hz]) from the fixed delay portion 14 and the serial latch code signals (frequency P/N [Hz]) from the latch code generator 13 are inputted to the clock recovery portion 31. The clock recovery portion 31 is composed of clock recovery portions $DCR_1$–$DCR_N$ (DCR: Digital Clock Recovery) for recovering clocks for each of the N-parallel signals, and a clock recovery portion $DCR_{LT}$ for the serial latch code signals, so that clock components are extracted from the received signals with one of the clocks being made a reference clock (master clock) and outputted, together with the data, to the bit changeover portion 32 as shown in FIG. 4A.

Thus, the data outputted from the clock recovery portions $DCR_1$–$DCR_N$ have dispersed data positions as shown in FIG. 4A, namely, skew states. Therefore, the bit changeover portion 32 changes over the bits of the N-parallel signals with the reference clock as shown in FIG. 4B, thereby eliminating shifts along the time axis before transmitting to the variable delay portion 34. It is to be noted that serial latch code signals (see FIG. 3D) outputted from the clock recovery portion $DCR_{LT}$ also have their bits changed over at the bit changeover portion 32.

Thus, the N-parallel signals and serial latch code signals having their bits changed over at the bit changeover portion 32 are transmitted to the bit shift detector 33 to detect the bit shift amounts.

Namely, in the bit shift detector 33, the N-parallel signals after the bit changeover as shown in FIG. 5A and the serial latch code signals shown in FIG. 3D are inputted. The serial latch code signals are internally converted into N-parallel expanded latch code data as shown in FIG. 5C, so that the bit shift amounts of the N-parallel signals are detected by performing a code matching between the N-parallel signals shown in FIG. 5A and the latch code signals shown in FIG. 5C.

In order to detect such bit shift amounts, the bit shift detector 33 uses a window (see FIG. 5B) of a predetermined bit number "W" as a bit shift monitoring range, on the basis of latch period signals as synchronizing signals shown in FIG. 5D corresponding to the frame signals of the serial latch code signals shown in FIG. 3D.

Namely, it is seen, for example, that a bit A6 of the N-parallel signals shown in FIG. 5A has a bit shift amount "A" to the latch period signals, a bit B6 a bit shift amount "B", a bit C6 a bit shift amount "C", and a bit N6 a bit shift amount "N".

The bit shift amounts of the parallel data thus obtained by the bit shift detector 33 are provided to the variable delay portion 34, and outputted from the variable delay portion 34 as skew adjusted N-parallel signals (frequency P/N [Hz]) as shown in FIG. 5F.

Therefore, the parallel signals outputted from the variable delay portion 34 are in the form aligned along the time axis as shown in FIG. 5F.

It is to be noted that an optimum bit range possibly generating skews can be used for the bit number of the above-mentioned window W in the light of experiences, experiments, or the like. Also, it is preferable to set the predetermined delay time of the fixed delay portion 14 for the phase adjustments to this window.

In the parallel signal transmission device according to the present invention (2), as schematically shown in FIG. 6, in addition to the arrangement of the present invention (1) shown in FIG. 1, the transmitting unit 1 is further provided with a scrambler (SCR) 15 for scrambling the parallel signals to be furnished to the latch 12 and the fixed delay portion 14, and the receiving unit 3 is further provided with a descrambler (DSR) 35 for descrambling the parallel signals outputted from the variable delay portion 34.

Hereinafter, the operation of the present invention (2) will be described referring to time charts shown in FIGS. 7A–7G.

The time charts shown in FIG. 7A illustrate parallel signals of N=8 so that the parallel signals shown in FIG. 7A respectively correspond to the parallel signals shown in FIG. 3A. The parallel signals scrambled by the scrambler 15 are shown with parentheses in FIG. 7B.

These scrambled parallel signals are sampled at the latch 12 in the same way as in FIG. 3B and serialized by the latch code generator 13 are shown as serial latch code signals in FIG. 7C.

Therefore, even if the parallel signals provided to the scrambler 15 are data fixed to "1" or "0", the output of the scrambler 15 can be transmitted to the receiving unit 3 without assuming fixed data since they are scrambled.

The foregoing similarly applies to the serial latch code signals shown in FIG. 7C, which assume mixed 0-and-1 signals.

In the receiving unit 3, skew adjustments are performed to the parallel signals after bit changeover shown in FIG. 7D in the same way as in FIG. 5F based on the received serial latch code signals shown in FIG. 7E and then outputted from the variable delay portion 34 as the parallel signals after the skew adjustments shown in FIG. 7F.

Then, descramblers $DSR_{1-DSRN}$ composing the descrambler 35 descramble the parallel signals, in opposite to the scrambler 15 in the transmitting unit 1, and recover the parallel signals into the original 8-parallel signals to be outputted.

Thus, the receiving unit 3 performs the clock recovery to the scrambled data, thereby stabilizing the clock recovery operation and improving the performance thereof.

In the parallel signal transmission device according to the present invention (3), as schematically shown in FIG. 8, in addition to the present invention (2) shown in FIG. 6, the latch 12 resets the scrambler 15 at the timing the latch 12 latches the parallel signals, and the bit shift detector 33 in the receiving unit 3 resets the descrambler 35 at the timing the bit shift detector 33 performs the skew adjustments to the variable delay portion 34.

Hereinafter, the operation of the present invention (3) will be described referring to time charts shown in FIGS. 9A–9H. It is to be noted that the parallel signals of N=8 are used in the examples of the time charts.

In FIGS. 9A–9H, only the latch timing signals shown in FIG. 9H for resetting the scrambler 15 are added to the time charts of FIGS. 7A–7G. The scrambling process of the scrambler 15 is reset by the latch timing signals, and the bit shift detector 33 resets the descrambling process of the descramblers $DSR_1$–$DSR_N$ by the corresponding latch synchronizing signals (see FIG. 5D) of the serial latch code signals shown in FIG. 9E.

Thus, the resetting is performed per each latch timing signal, so that even if the data are erred in the transmission line 2, their influence on other sampling data is suppressed, thereby stabilizing the operation of the clock recovery portion.

In the parallel signal transmission device according to the present invention (4), the above-mentioned parallel number in the parallel signals is made a prime number. Hereinafter, this will be described referring to the operation time charts shown in FIGS. 10A–10E.

For example, the signals shown in the time charts of FIGS. 2A and 2B are n-multiplexed N-parallel signals. In case of n=N and arbitrary bits fixed to "0" or "1", the signal lines at the time of conversion into parallel signals always assume fixed data of "0" or "1".

In order to avoid this fact, in the present invention (4), the parallel number "N" comprises a prime number, that is "5" in this example. Thus, for example, data A8 (A8-1-A8-7) shown by boldface characters are transmitted randomly through five parallel signal lines, as seen from comparing FIGS. 10A and 10C. Therefore, even if the data A8 are the fixed data, transmission on fixed signal lines is eliminated, thereby stabilizing the operation of the clock recovery portion and contributing to the performance improvement thereof.

In the parallel signal transmission device according to the present invention (5), the above-mentioned parallel number and a bit number at a sampling interval latched by the latch 12 are mutually made a prime relationship. Hereinafter, this will be described referring to the operation time charts shown in FIGS. 11A–11E. It is to be noted that FIGS. 11A–11E correspond to the time charts shown in FIGS. 10A–10E.

In this operation example, as shown in FIG. 11A, N=4 parallel signals with the data period of 1 frame=16 bits are used, and since the period of the serial latch code signals shown in FIG. 11B is 7 bits, the latch timing of the latch 12 and the data period are mutually in the prime relationship.

As a result, data of xx-1 (A1-1-A4-1) are latched in the first frame, data of xx-4 (A1-4-A4-4) are latched in the second frame, no data is latched in the third frame, and data of xx-3 (A1-3-A4-3) are latched in the fourth frame.

Therefore, data of different timings are latched each time, so that even if the data are periodic, the data of different timings are latched per frame, thereby avoiding the miss detection due to fixed bits in the bit shift detector 33.

It is preferable that the bit shift detector detects the bit shift amounts of the parallel signals in a predetermined stage of forward and backward protection units.

Also, it is preferable that the bit shift detector has a determining unit for determining the synchronization established state where the bit shift amounts are detected only when a protection is established by only one of the protection units.

Moreover, it is preferable that the bit shift detector has a prohibiting unit for prohibiting the code matching at timings other than timings of synchronizing signals when the synchronization established state is obtained.

It is more preferable that the bit shift detector has a clearing unit for clearing the protection units of the corresponding parallel signals when the synchronization established state is not obtained.

It is further preferable that the bit shift detector has a warning unit for generating a warning when the synchronization established state is not obtained for a predetermined time.

BRIEF DESCRIPTION OF THE DRAWINGS

FIGS. 5A–5F are time charts showing an operation of skew adjustments in a receiving unit shown in FIG. 1;

FIGS. 9A–9H are time charts showing an operation example of the present invention (3) shown in FIG. 8;

FIG. 11A–11E are time charts showing an operation example of a parallel signal transmission device according to the present invention (5);

FIGS. 14A–14D are time charts showing an operation of a latch code generation in a transmitting unit shown in FIG. 12;

FIGS. 18A–18K are operation time charts of the bit shift detector shown in FIG. 17;

Throughout the figures, like reference numerals indicate like or corresponding components.

DESCRIPTION OF THE EMBODIMENTS

Figure 1:
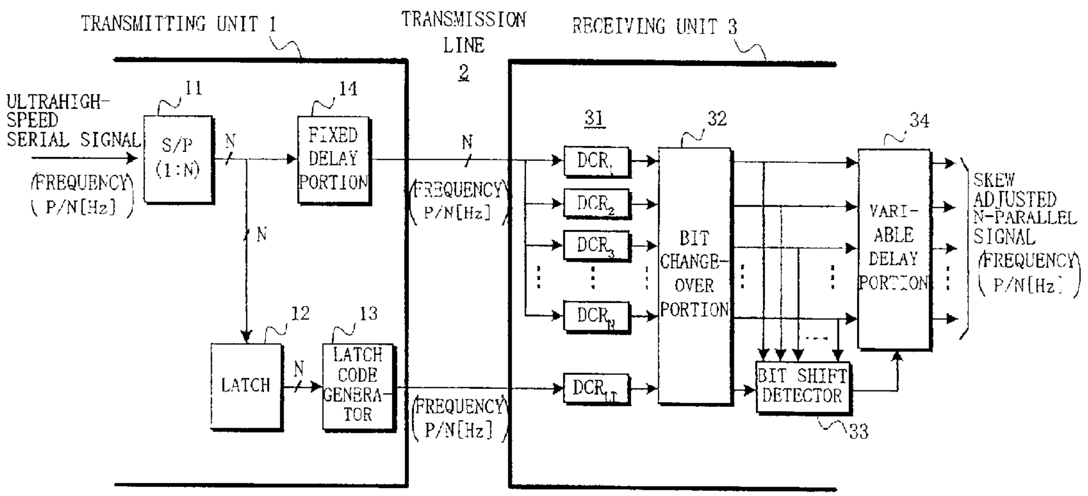
FIG. 1 is a block diagram showing a schematic arrangement of a parallel signal transmission device according to the present invention (1)
Figure 2A:
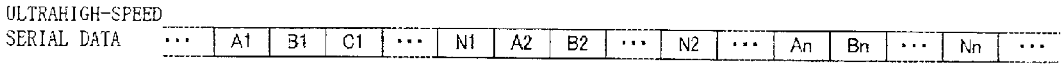
FIGS. 2A and 2B are time charts showing an operation of a serial-parallel conversion in a transmitting unit shown in FIG. 1.
Figure 2B:
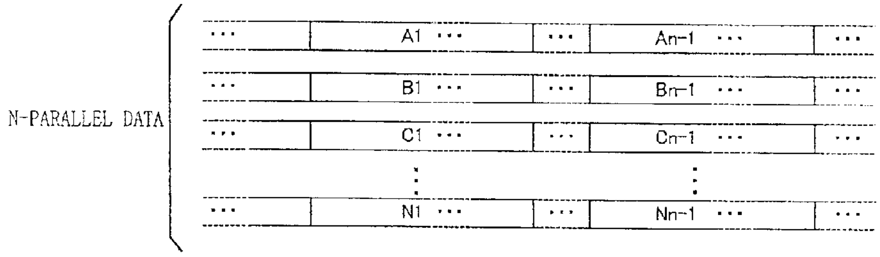
Figures 3A, 3B, 3C, 3D:
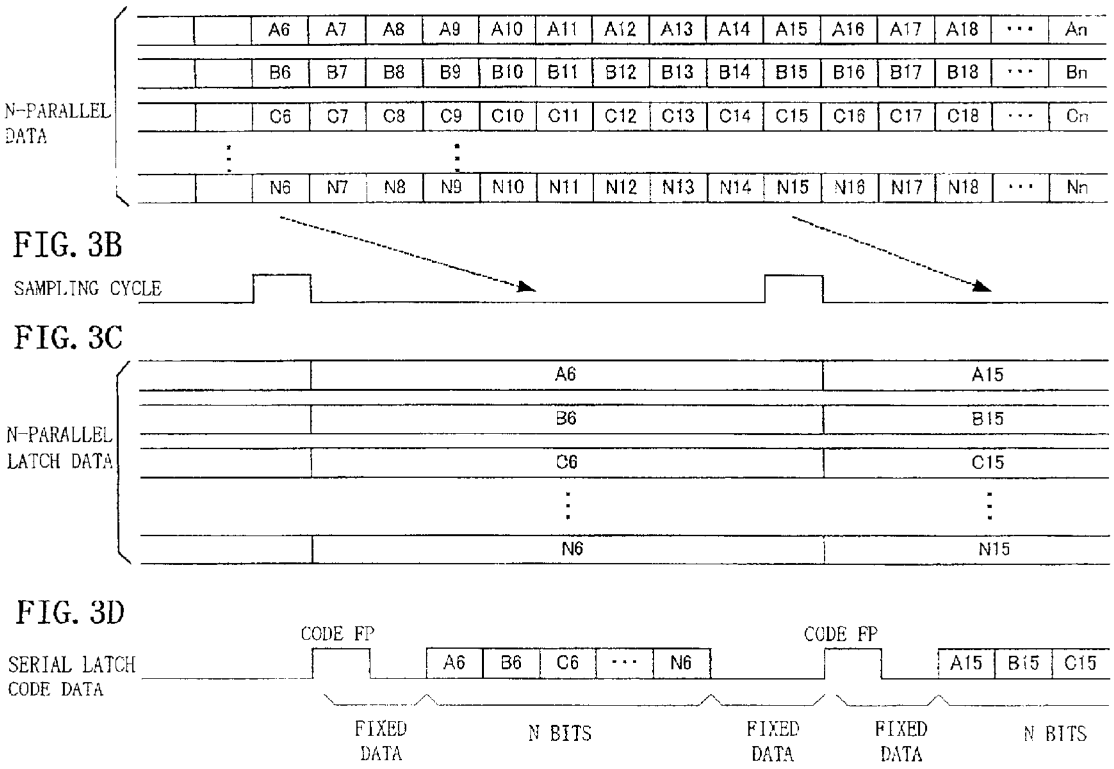
FIGS. 3A–3D are time charts showing an operation of a latch code generation in a transmitting unit shown in FIG. 1.
Figure 4A:
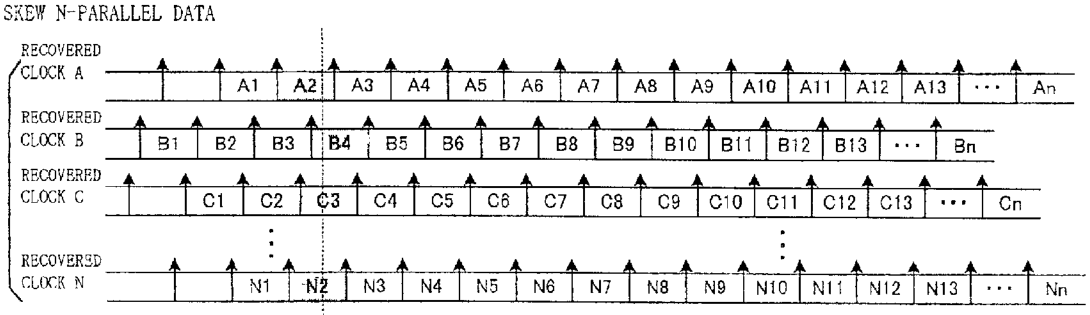
FIGS. 4A and 4B are time charts showing an operation of a bit changeover in a receiving unit shown in FIG. 1.
Figure 4B:
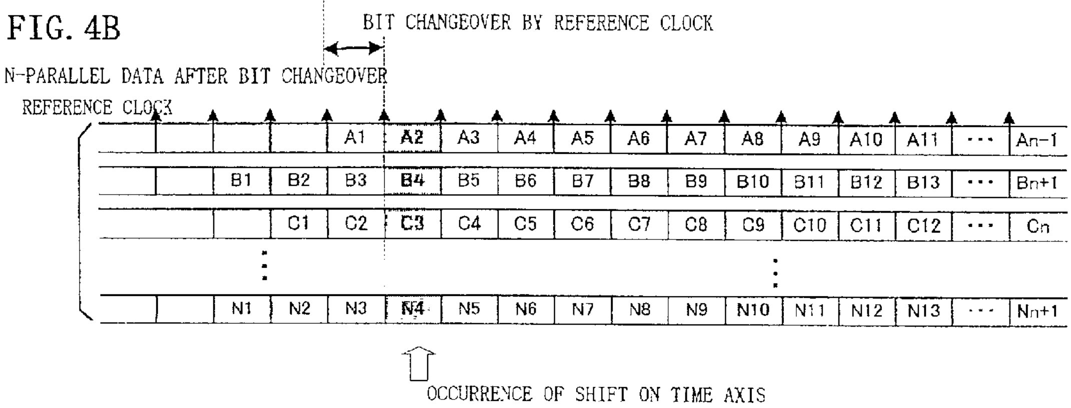
Figure 6:
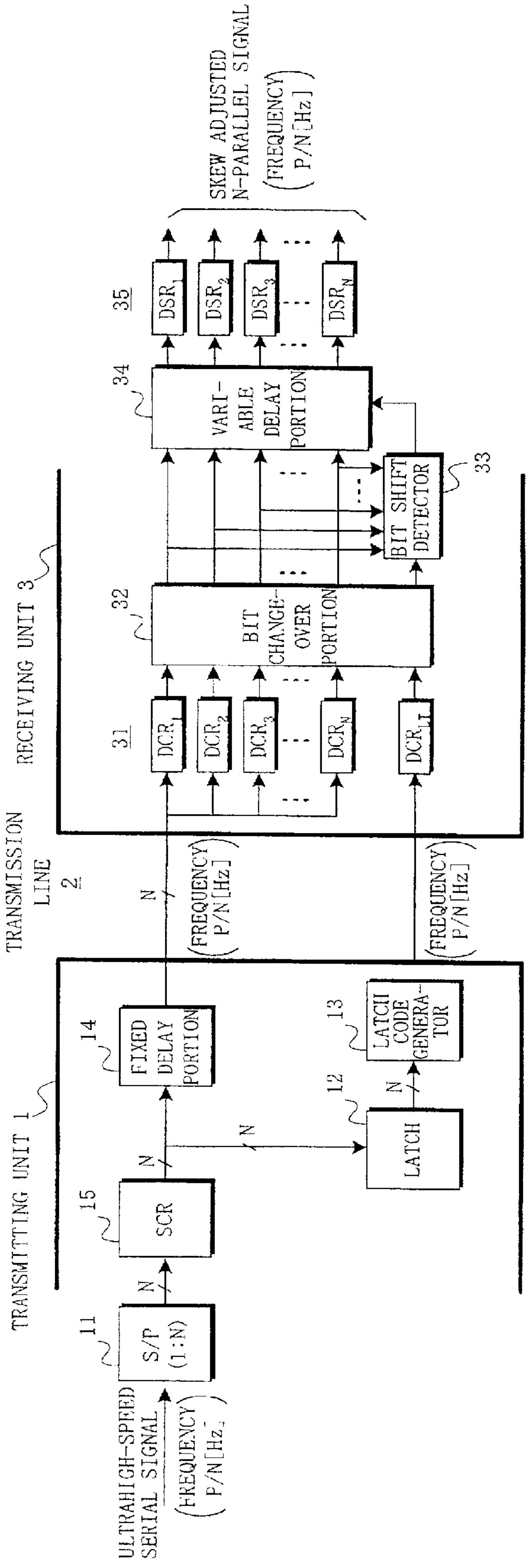
FIG. 6 is a block diagram showing a schematic arrangement of a parallel signal transmission device according to the present invention (2)
Figures 7A, 7B, 7C, 7D, 7E, 7F, 7G:
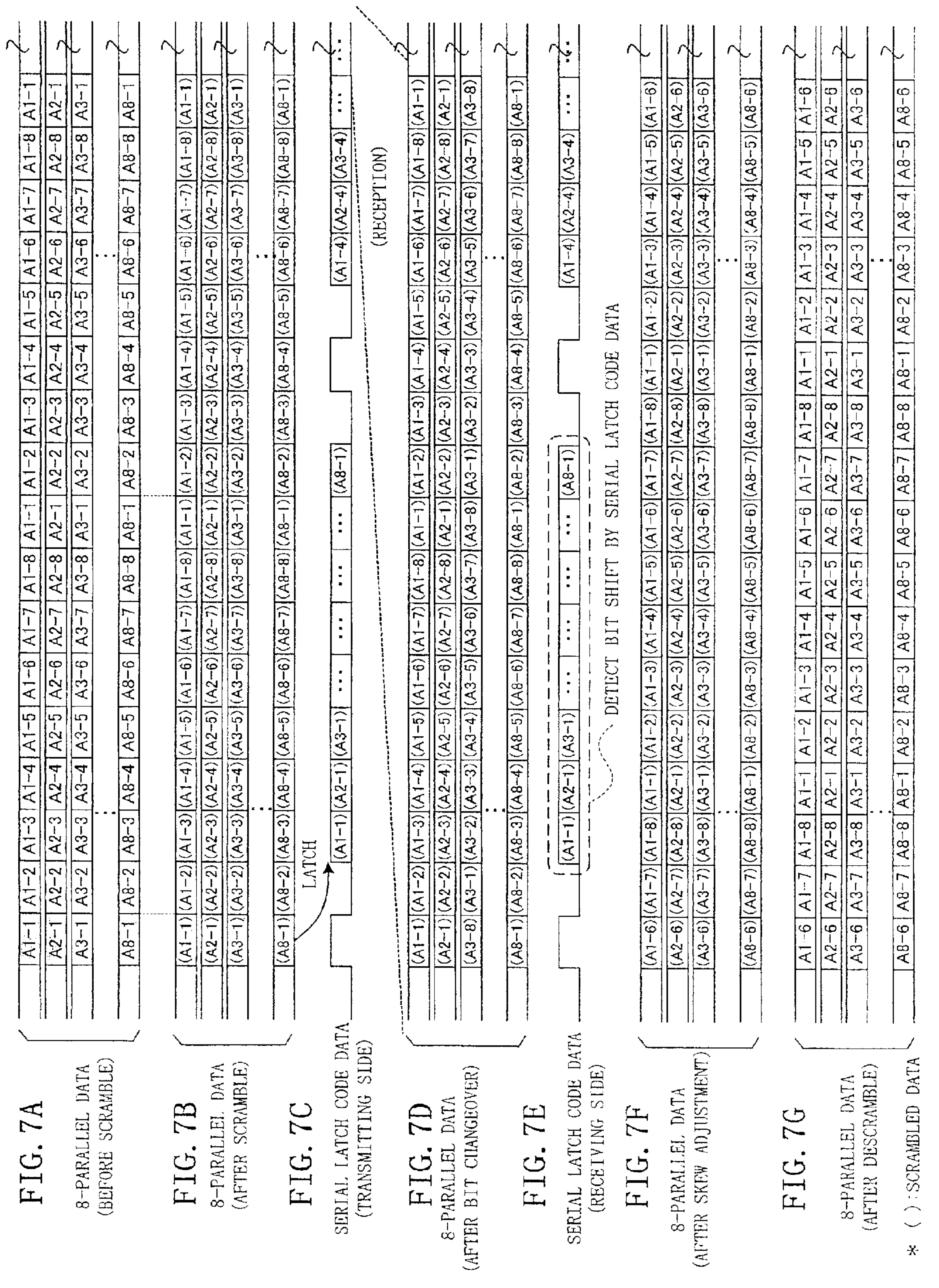
FIGS. 7A–7G are time charts showing an operation example of the present invention (2) shown in FIG. 6.
Figure 8:
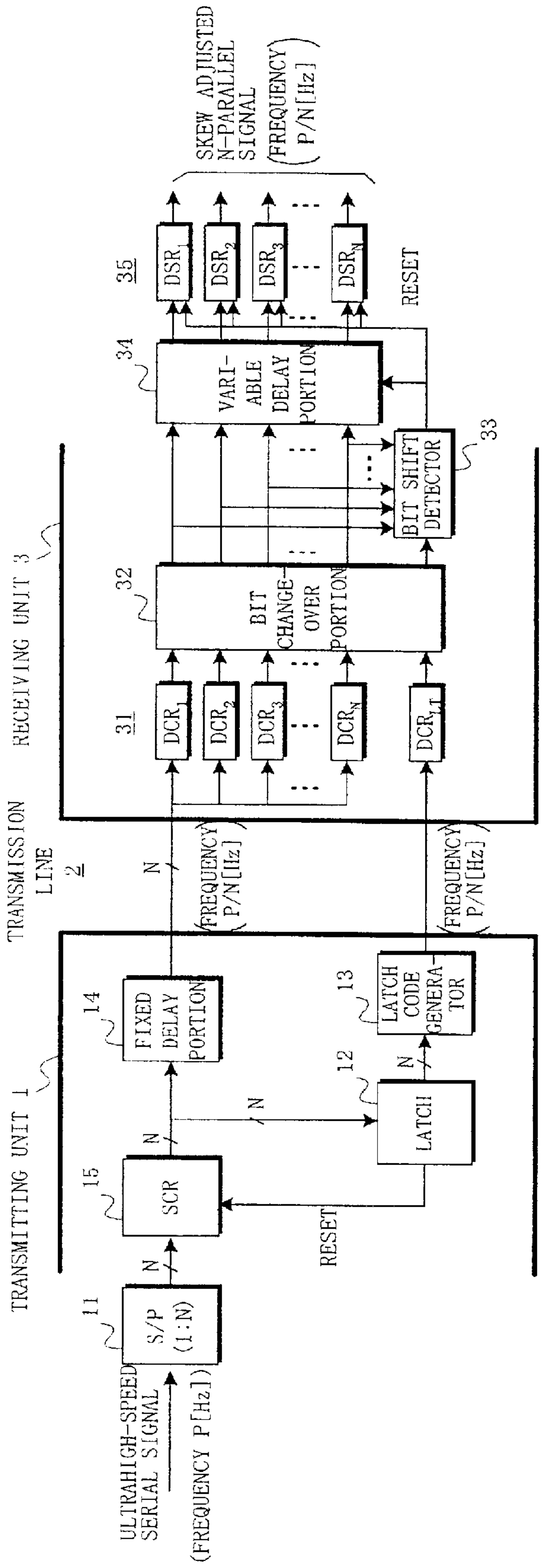
FIG. 8 is a block diagram showing a schematic arrangement of a parallel signal transmission device according to the present invention (3)
Figures 10A, 10B, 10C, 10D, 10E:
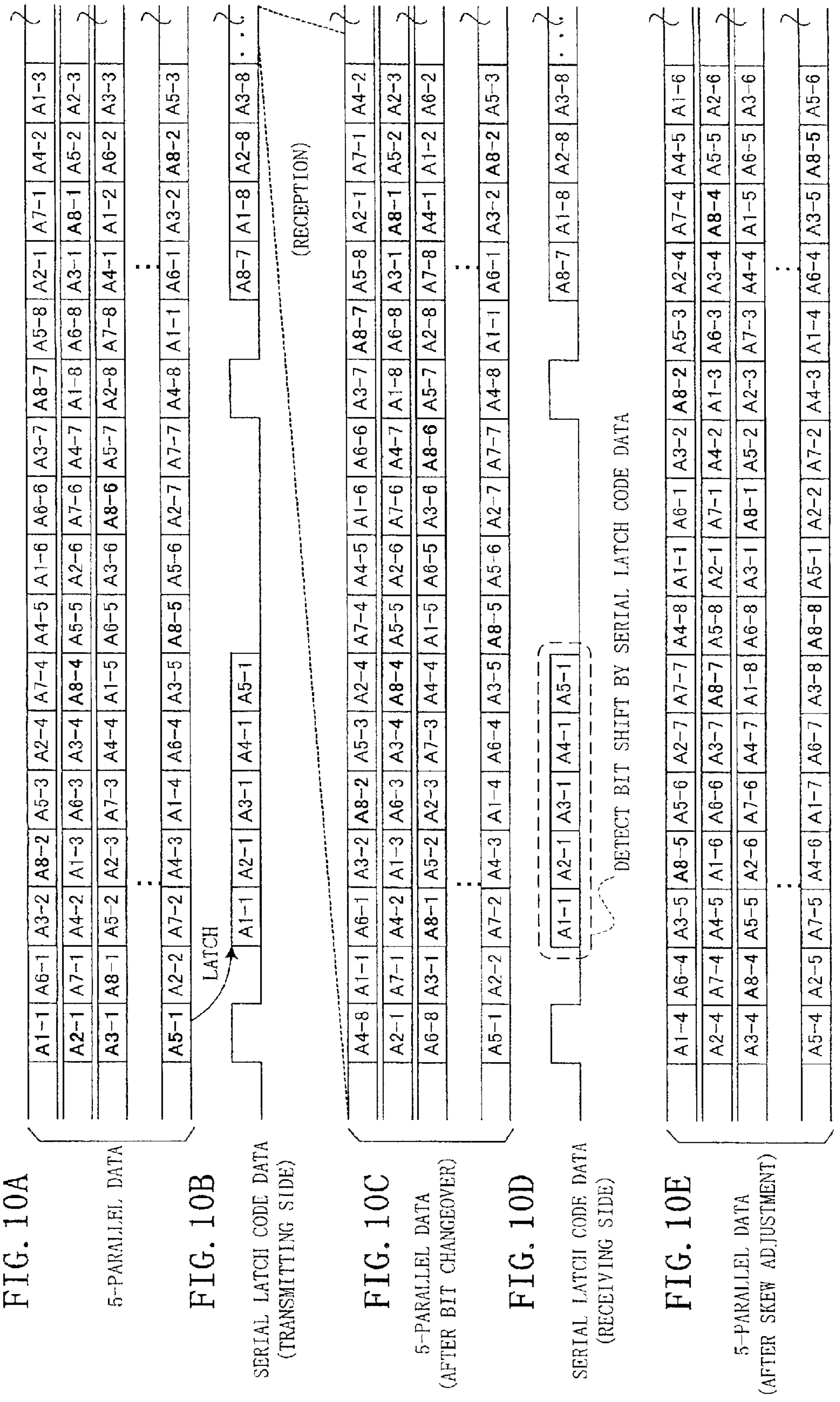
FIG. 10A–10E are time charts showing an operation example of a parallel signal transmission device according to the present invention (4)
Figure 12:
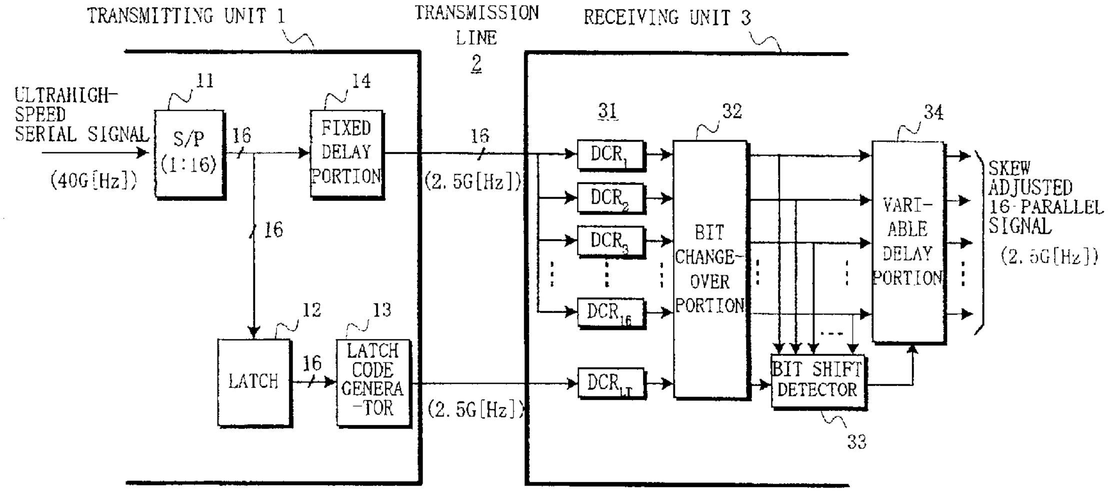
FIG. 12 is a block diagram showing an embodiment of the present invention (1)

FIG. 12 shows an embodiment of the parallel signal transmission device according to the present invention (1) schematically shown in FIG. 1. In this embodiment, input serial signals of 40 GHz ultrahigh-speed serial signals are converted into N=16 parallel signals to be serviced, and the clock recovery portion 31 corresponding thereto is composed of 16 clock recovery portions $DCR_1$–$DCR_{16}$. Also, operation time charts shown in FIGS. 13A, 13B, 14A–14D, 16A, 15B, and 16A–16F respectively correspond to the time charts shown in FIGS. 2A, 2B, 3A–3D, 4A, 4B, and 5A–5F.

Figure 13A:
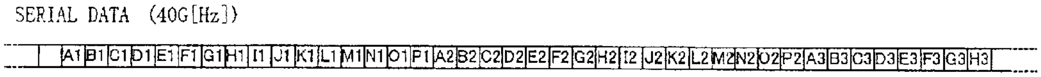
FIGS. 13A and 13B are time charts showing an operation of a serial-parallel conversion in a transmitting unit shown in FIG. 12.
Figure 13B:
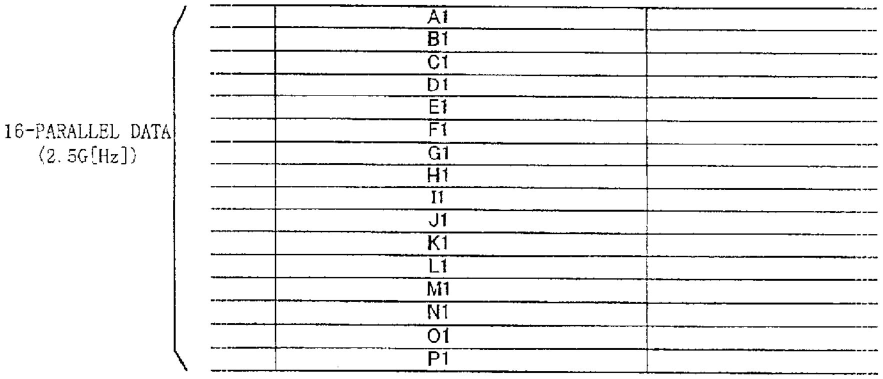

In the transmitting unit 1, the serial-parallel converter 11 firstly converts the 40 GHz ultrahigh-speed serial signals shown in FIG. 13A into 16-parallel signals shown in FIG. 13B to be transmitted to the latch (circuit) 12 and the fixed delay portion 14.

The latch 12 generates 16-parallel signals shown in FIG. 14C by a sampling period shown in FIG. 14B to be transmitted to the latch code generator 13. The latch code generator 13 generates serial latch code signals (see FIG. 14D) of a frame longer than the 16-bit length of frequency P/N=40/16=2.5 GHz to be transmitted to the receiving unit 3.

The serial latch code signals include frame pulses FP's indicating the heads of the frames and fixed bits besides data strings of serialized 16-parallel signals latched at the latch 12, thereby composing a format which makes the identification of data easy in the receiving unit 3.

Also, the fixed delay portion 14 of the transmitting unit 1 provides, in order to make a synchronization with the timing of the bit shift detection in the receiving unit 3, a predetermined bit delay to the 16-parallel output data to be transmitted to the receiving unit 3.

In the receiving unit 3, the clock recovery portions $DCR_1$–$DCR_{16}$ composing the clock recovery portion 31 recover clocks of the 16-parallel signals, and the clock recovery portion $DCR_{LT}$ also composing the clock recovery portion 31 recovers the clock of the serial latch code signals, respectively to be transmitted to the bit changeover portion 32.

Figures 15A, 15B:
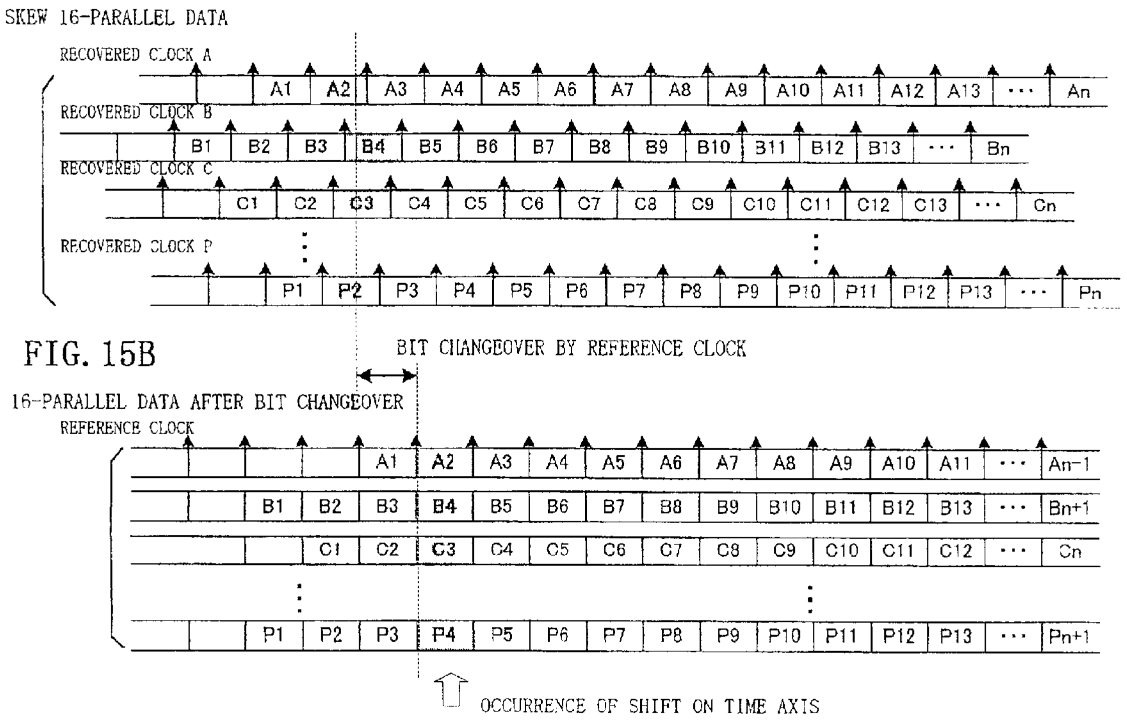
FIGS. 15A and 15B are time charts showing an operation of a bit changeover in a receiving unit shown in FIG. 12.

The bit changeover portion 32 uses one of the recovered clocks as a reference clock (master clock) to perform a bit changeover, as shown in FIG. 15B, of the 16-parallel data in a skewed state shown in FIG. 15A and the serial latch code signals, thereby having the data alignment converted based on the reference clock.

Thus, the 16-parallel signals and the serial latch code signals having the bit changeover at the bit changeover portion 32 are transmitted to the bit shift detector 33.

Figure 16A:
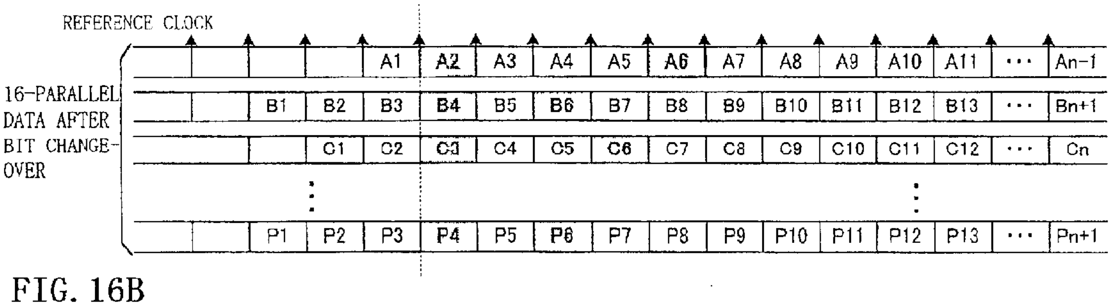
FIGS. 16A–16F are time charts showing skew adjustments in the receiving unit shown in FIG. 12.
Figure 16B:
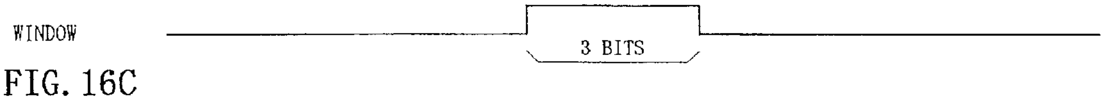

The bit shift detector 33 sets a window (monitoring range) of W=3 bits as shown in FIG. 16B in order to match with the sampled latch code transmitted from the transmitting unit 1.

The window of this case is generated according to the position of the frame pulse FP of the serial latch code signals from the transmitting unit 1, and has a total width of 3 bits including a previous and a next bit in view of a skew occurrence based on experiments or the like.

Figure 16C:
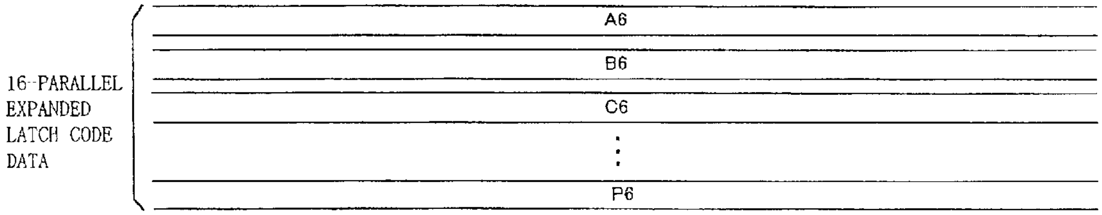
Figure 16D:
Figure 16E:
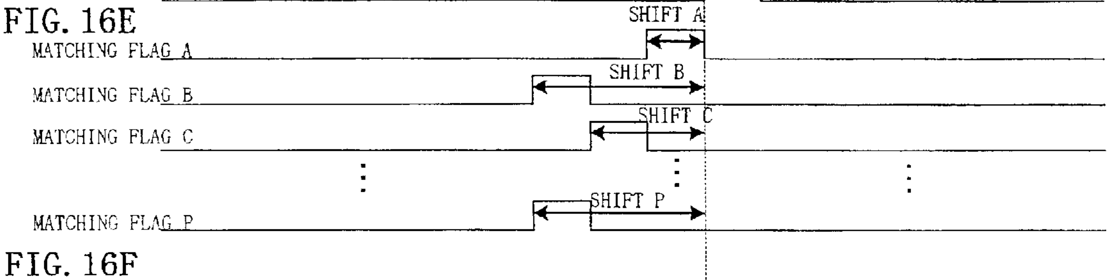

In such a window, as shown in FIG. 16E as well as in FIG. 5E, bit shift amounts are detected to by mutually matching the codes of the 16-parallel data shown in FIG. 16A and the 16-parallel expanded latch code signals shown in FIG. 16C.

Namely, in the comparison therebetween, a flag is set up at the matched point, so that the bit shift amounts of the 16-parallel signals are detected by using the matching flag. This monitoring is performed until the flag pattern fixes on the same position for a long period of time.

Also, it is preferable to use a forward and a backward protection to determine the bit shift detection.

Figure 16F:
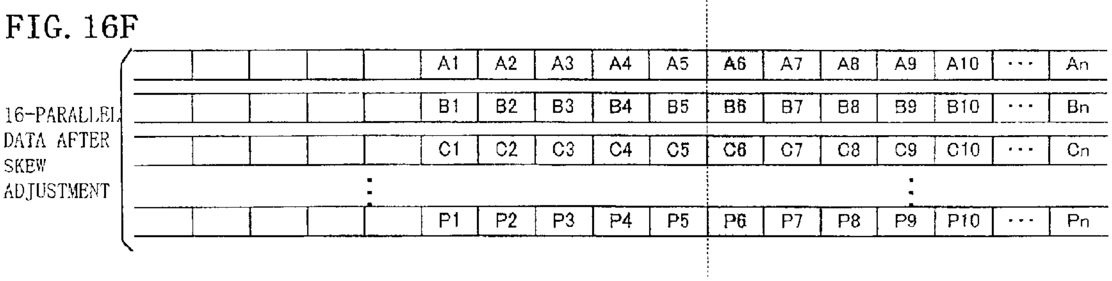
Figure 17:
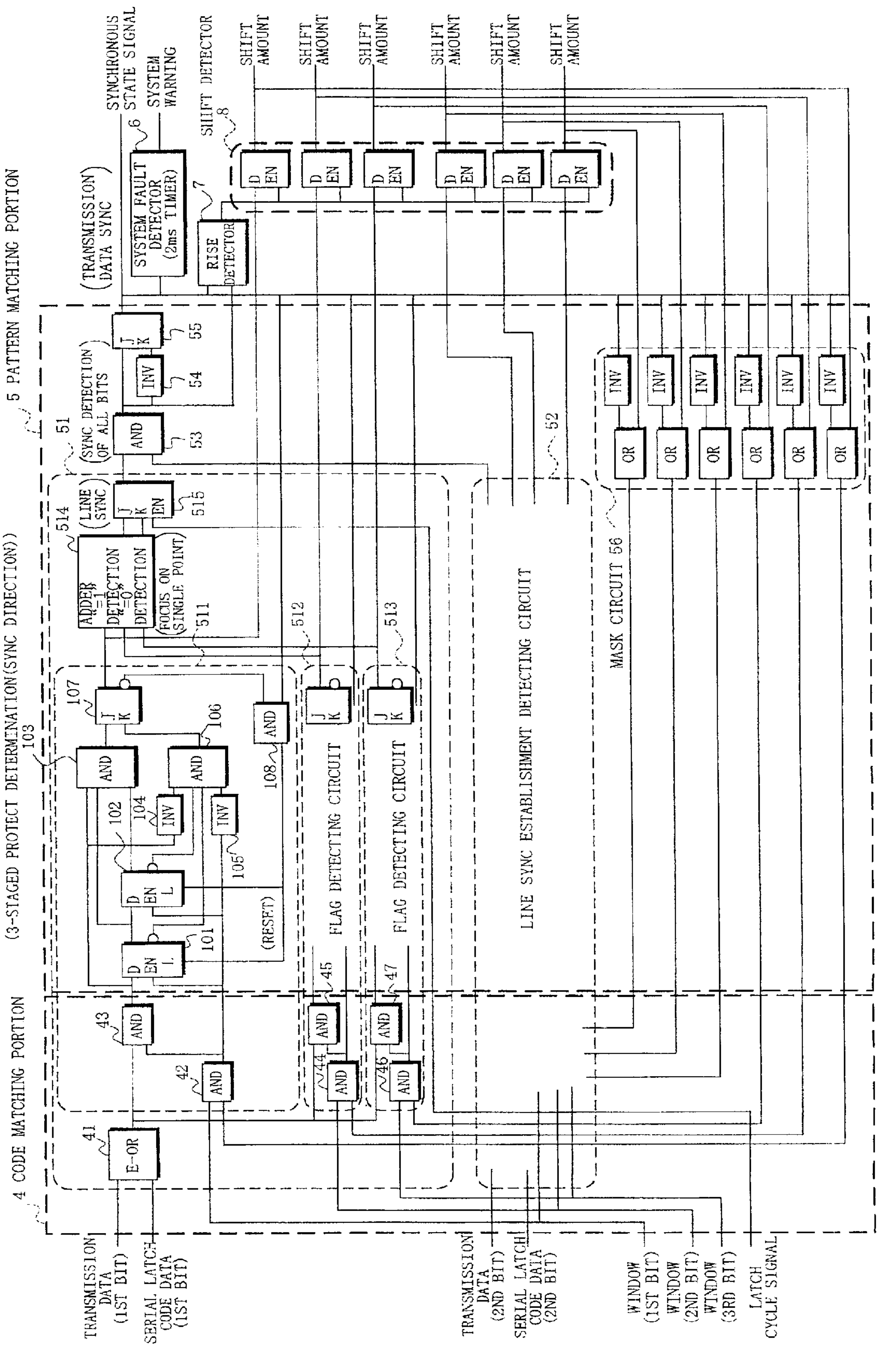
FIG. 17 is a block diagram showing an embodiment of a bit shift detector used in the present invention.

When the bit shift amounts are thus detected, the bit shift amounts to the latch period signals can be measured as shown in FIG. 16E. Therefore, by providing the bit shift amounts to the variable delay portion 34, the 16-parallel signals of 2.5 GHz rearranged for the data alignment on the original time axis can be outputted as shown in FIG. 16F as well as in FIG. 5F.

Hereinafter, an embodiment of the above-mentioned bit shift detector 33 will be described in detail referring to FIGS. 17, and 18A–18K. It is to be noted that in this embodiment, the signal line (transmission line) has the parallel number N=2, and the window W=3 bits.

Firstly, the bit shift detector 33 is roughly composed of a code matching portion 4, a pattern matching portion 5, a system fault detector 6, a rise detector 7, and a shift detector 8.

Among the above, the code matching portion 4 is composed, for one of the two parallel signal lines (first bit transmission data), an E-OR (Exclusive OR) circuit 41 for detecting a matching by inputting the transmission data (2-parallel signals) from the fixed delay portion 14 of the transmitting unit 1 and the serial latch data from the latch code generator 13 having been further converted into parallel data, AND circuits 42–47 (AND circuits 42 and 43 for the first bit windows; AND circuits 44 and 45 for the second bit windows; an AND circuits 46 and 47 for the third bit windows) for detecting a code matching as will be later described. Although similar circuits are used for the other signal line (second bit transmission data), they are not shown in the FIG. 17 for the sake of simplification.

Also, the pattern matching portion 5 includes line sync establishment detecting circuits 51 and 52, an AND circuit 53, an inverter 54, a register (J-F flip-flop) 55, and a mask circuit 56.

The line sync establishment detecting circuits 51 and 52 are respectively provided for a single signal line. Although their internal arrangements are the same, only that of the line sync establishment detecting circuit 51 is shown for the sake of simplification.

Namely, the line sync establishment detecting circuit 51 includes flag detecting circuits 511–513, an adder 514, and a register 515. The AND circuits 42–47 are also included in the line sync establishment detecting circuit 51.

The flag detecting circuits 511–513 respectively detect the flag for each bit in the window of 3-bit width as shown in FIGS. 5E and 16E. Although their internal arrangements are the same, only that of the flag detecting circuit 511 is shown for the sake of simplification.

Namely, the flag detecting circuit 511 comprises 3-staged protection circuits for flag detection, which includes registers (D flip-flop) 101 and 102 connected in cascade for inputting the output signals of the AND circuit 43 in the code matching portion 4, and an AND circuit 103 for performing 3-staged protection determination in sync establishing direction by inputting the output signals of the AND circuit 43, the register 101, and the register 102. The flag detecting circuit 511 further includes, in the sync losing direction, an inverter 104 for inverting the output signals of the AND circuit 43, an inverter 105 for inverting the output signals of the AND circuit 42, and an AND circuit 106 for inputting the inverted output signals of the registers 101 and 102 and for inputting the output signals of the inverters 104 and 105. Also, the AND circuits 42 and 43 are included in the flag detecting circuit 511 .

The output signals of the AND circuits 103 and 106 are respectively inputted to a J-terminal and a K-terminal of a register (J-K flip-flop) 107. Moreover, the inverted output signals of the register 107 are inputted to an AND circuit 108 with sync state signals described later, and the output signals of the AND circuit 108 are connected to clear terminals L of the registers 101 and 102.

The adder 514 inputs the outputs of the flag detecting circuits 511–513, and is connected to a register 515 for determining the line sync establishment of each signal line. The register 515 inputs the two output signals of the adder 514 respectively to the J-terminal and the K-terminal, and makes the latch period signals (see FIG. 16D) the enable signals (synchronizing signals).

The respective output signals of the line sync establishment detecting circuits 51 and 52 are inputted to the AND circuit 53 for detection of all bit synchronization. The output of the AND circuit 53 is inputted to the J-terminal of the register 55 for generating the sync state signals, and the inverted signals are inputted to the K-terminal through the inverter 54.

The output signals (sync state signals) of the register 55 are provided to the system fault detector 6 and the rise detector 7, as well as the mask circuit 56 in the pattern matching portion 5.

The system fault detector 6 generates a system warning, and the rise detector 7 receives the output signals from the AND circuit 53 as well simultaneously for detecting the rise, so that rise detection signals are made the enable signals of the 6 registers in the shift detector 8.

The shift detector 8 inputs 6 input signals in total including the respective output signals of the flag detecting circuits 511–513 and the similar flag detecting signals of the other line sync establishment detecting circuit 52, and detects the bit shift amounts in the window range of three bits per single signal line by the output signals of the rise detector 7, namely 6 bit shift amounts in total for the 2 signal lines in all.

As described above, the bit shift amounts of the shift detector 8 are transmitted to the variable delay portion 34 as well as the mask circuit 56 in the pattern matching portion 5. The mask circuit 56 is composed of 6 inverters and 6 OR circuits corresponding to the shift detector 8. The shift amounts from the shift detector 8 are inputted to the OR circuits and the output signals of the register 55 are provided to the inverters.

As for the output signals of the OR circuits of the mask circuit 56, 3 output signals on the lower side are transmitted to the AND circuits 42, 44, and 46 in the code matching portion 4, so that logical products of the first bit of the parallel signals and the bits of the 3-bit window are obtained for masking the code matching, and 3 OR circuits on the upper side masks the code matching for the second bit of the parallel signals.

Hereinafter, the operation of the bit shift detector 33 having such an arrangement will be described referring to the time charts shown in FIGS. 18A–18K.

Firstly, a code matching is performed to the inputted parallel signals per each signal line by the code matching portion 4. As described above, each signal line (transmission line) has a window of 3-bit width (see FIG. 18A). In order to check which of the bits within the window has the parallel signals and the latch code signals matched (see FIGS. 5A–5C, and 16A–16C), a code matching of 3-bit window per single signal line (line) is performed.

Namely, FIG. 18D shows a result where the E-OR circuit 41 has performed the matching detection (flag detection) of the first bit parallel signals (first bit transmission data shown in FIG. 18B) with the first bit of latch code signals (see FIG. 18C) within the window width of 3-bits.

Similarly, FIG. 18E shows a state where an E-OR circuit (not shown) performs the matching flag detection of the second bit of the parallel signals (see FIG. 18B) with the latch code signals (see FIG. 18C) within the window width of 3-bits.

As a result, the code matching is performed at 6 points in the 2 signal lines in all as shown in FIGS. 18D and 18E, and the matching flag rises when the parallel signals and latch code signals are mutually matched. Thus, it is made possible to recognize whether or not the parallel signals are matched with the latch code signals in any bits within the window for each signal line.

It is to be noted that in the present state, the mask signals from the mask circuit 56 assume enable signals to the AND circuits 42, 44, and 46, and the 3-bit window signals are transmitted unchanged to the AND circuits 43, 45, and 47.

Thus, the output signals from the AND circuits 43, 45, and 47 are respectively transmitted to the flag detecting circuits 511, 512, and 513 to have 3-staged protection performed therein. This is likewise in the line sync establishment detecting circuit 52.

Namely, in case of the flag detection circuit 511, FIG. 18G shows a state where the protection stage of each window is provided for the first bit of the parallel signals at the line sync detection timing (see FIG. 18F) by way of the registers 101, 102, and the AND circuit 103, as well as the register 107. In the example of FIG. 18G, a state ① is shown on the right end where only the first bit of the parallel signals establishes the 3-staged protection.

Also, as for the second bit of the parallel signals, as shown in FIG. 18H, a state ② is shown where the first and the third bits of the window have the 3-staged protection established.

Such 3-staged protection in sync establishing direction is performed by the registers 101, 102, the AND circuit 103, and the register 107.

At this time, the number of the state where the 3-staged protection is established, namely, whether or not the synchronization is established at a plurality of positions is checked using a pulse for recognizing outside of the window (the bit position following the window in the example shown.

This is because, as shown in e.g. state ② of FIG. 18H, in case the parallel signals have the pattern "101" in the 3 bits within the window, and the latch code signals to be compared with are "1", they are 2 points where the parallel signals match with the latch code signals, thereby simultaneously establishing the 3-staged protection in a plurality of bits within the window.

Therefore, the adder 514 and the register 515 detect the state ② shown in FIG. 18H where the protection is established at a plurality of points, and judges that a specific "shift" has not yet been detected (shift amounts cannot be specified since synchronization is detected at a plurality of bits), so that the protection is taken until focusing the 3-staged protection-established state on one point per a single signal line. In this case, the adder 514 provides an output of "=1" to the J-terminal of the register 515 when the number of "1" is single, while providing an output of "=0" to the K-terminal of the register 515 when the number of "1" is zero or plural.

As a result, in the case shown in FIG. 181, the state ③ in FIG. 18G has only one 3-staged protection established, so that the synchronization is established, so that the sync establishment signal is transmitted from the line sync establishment detecting circuit 51 to the AND circuit 53.

In the case shown in FIG. 18J, the state ④ in FIG. 18H, where the second bit of the parallel signals in FIG. 18H has the third bit of the window changed to protection stage "0", has only one 3-staged protection established, so that the sync establishment signal shown as state ⑤ in FIG. 18J is transmitted from the line sync establishment detecting circuit 52 to the AND circuit 53 to obtain the logical products with the synchronization establishment signal from the register 515 of the line sync establishment detecting circuit 51.

As a result, as shown in FIG. 18K, only in a state ⑥ where both of the first bit and the second bits of the parallel signals are in the sync established state, it is recognized that the synchronization of the parallel signal is established, whereby the synchronization state signal is outputted from the register 55. Namely, when the 3-staged protection is established for only one point in a single signal line the synchronization is established for the signal line. Only when the synchronization is established in all of the signal lines, the synchronization as the parallel signals is established.

When the synchronization for the transmission data is established, bit shift amounts are extracted in order to recognize how much bit delay amounts exist for the signal lines.

In order to do this, the rise detector 7 detects the rise at the time of synchronization establishment by the output signals of the register 55 and the AND circuit 53. At this timing, the output signals of the flag detecting circuits 511–513 and the flag detecting circuits (not shown) in the line sync establishment detecting circuit 52 are respectively provided to the D terminals of the 6 registers composing the shift detector 8.

In this case, the rise detection signal from the rise detector 7 indicates in which position within the window the synchronization is established, so that the signals outputted from the 6 registers composing the shift detector 8 indicate in which bit in the window the synchronization has been made, i.e. the "bit shift amount". The bit shift amounts are outputted to the variable delay portion 34.

Although the bit shift amounts are thus obtained, during the synchronization in the form of the parallel signals being established, the code matching portion 4 has only to monitor the matching/mismatching between the parallel signals and the latch code signals in the bit of the synchronization establishment within the window width. Therefore, in the mask circuit 56, the OR circuits takes the logical sum of the output signals of the shift detector 8 and the inverted signals of the synchronization state signals from the register 55 inverted by the inverters, so that the code matching-mask signals from the OR circuits are provided to the AND circuits 42, 44, 46, and the AND circuits (not shown) (6 AND circuits in total), and the logical products of the mask signals and the window are obtained, thereby blocking the code matching for the bit where synchronization is not established.

Also, a forced load signal is generated by the synchronization state signals from the register 55 and the three flag detecting registers provided for each signal line (register 107 in case of flag detecting circuits 511).

Namely, when the synchronization in the form of the parallel signals is established, the registers for recognizing the synchronization of the signal lines must indicate that synchronization state is established in only one of the signal lines. Taking the register 107 as an example, the inverted signal therefrom and the synchronization state signal of the register 55 are provided through the AND circuit 108 to the clear terminals L of the registers 101 and 102, thereby clearing the registers 101 and 102.

This is for avoiding the recognition of the previous state (when the synchronization in the form of the parallel signals is previously established) at the time of 3-staged protection detection when the synchronization in the form of the parallel signals is lost and all of the bits within the window are started to be monitored again, namely for the prevention of mis-synchronization.

The above-mentioned protection deals with 3-staged protection in the sync establishing direction. As for the sync losing direction, in the example of the flag detecting circuit 511, the protection is performed by the registers 101, 102, the inverters 104, 105, and the AND circuit 106.

Namely, in case even a single line of the parallel signals has no flag rise within consecutive three bits, the only register which was in the synchronized state among the three registers (register 107, etc.) for recognizing the synchronization for each signal line will lose the synchronization, thereby changing the result of the adder 514 from "=1" to "=0".

As a result, the output of the register 515 will be inverted and the output of the AND circuit 53 becomes "0", so that the synchronization state signals from the register 55 will indicate a sync lost state.

When it becomes the sync lost state as mentioned above, in the mask circuit 56, the signals of "1" inverted through the internal inverters will be provided to the OR circuits, so that regardless of the shift amount from the shift detector 8, all of the bits within the window per signal line become the object to be monitored, thereby performing the code matching at all of the 6 points.

Also, the system fault detector 6 monitors whether or not there is a system fault by using the sync state signals from the register 55. For example, when the synchronization in the form of the parallel signal is not established even after a lapse of 2 ms, the system fault detector 6 determines that there is abnormality in the parallel signals, and generates an alarm.

Upon receipt of the alarm signal, e.g. a CPU (not shown) will extract the states of the registers 107, etc. for recognizing the synchronization per each signal line in order to check in which signal line the synchronization has not been yet established. The warning signal will be canceled when the synchronization as the parallel signals is established.

As described above, a parallel signal transmission device according to the present invention is arranged such that a transmitting unit generates serial latch code signals from periodically latched parallel signals besides transmitted parallel signals, and adjusts phases of the parallel signals to the serial latch code signals by delaying the parallel signals by a predetermined delay time; and a receiving unit changes over bits of the parallel signals from the transmitting unit based on recovered clocks, detects-bit shift amounts of the parallel signals after bit changeover, and performs skew adjustments of the parallel signals depending on the bit shift amounts. Therefore, it is made possible to perform flexible skew adjustments to the skews generated on transmission lines in ultrahigh-speed/large-capacity signal transmission.

Also, by making the receiving unit descramble the data scrambled at the transmitting unit, the clock recovery function is stabilized and the performance thereof is improved.

Moreover, by arranging the transmitting unit to reset the scrambling operation after scrambling and the receiving unit to reset the descrambling operation after descrambling at a timing the receiving unit detects bit shift amounts, such an effect is achieved that even if the data are erred in the transmission line, their influence is suppressed.

Moreover, in the present invention, by comprising a parallel number with a prime number, or by setting a prime relationship between a number of parallel and a bit number of the latch sampling intervals, periodic fixed-pattern data can be avoided, thereby contributing to the stabilization of the operation of clock recovery function and the improvement of the performance.

What we claim is:

1. A parallel signal transmission device comprising:

a transmitting unit, for converting serial signals into parallel signals to be transmitted, provided with a latch for periodically latching the parallel signals besides the transmitted parallel signals, a code signal generator for generating serial code signals including synchronizing signals from the signals latched at the latch, and a fixed delay portion for adjusting phases of the parallel signals to the serial code signals by delaying the parallel signals by a predetermined delay time; and a receiving unit, for receiving the parallel signals, provided with a clock recovery portion of the parallel signals and the serial code signals, a bit changeover portion for changing over bits of the parallel signals and the serial code signals based on clocks recovered by the clock recovery portion, a bit shift detector for detecting bit shift amounts of the parallel signals outputted from the bit changeover portion based on the serial code signals, and a variable delay portion for performing skew adjustments of the parallel signals outputted from the bit changeover portion depending on the bit shift amounts.

2. The parallel signal transmission device as claimed in claim 1 wherein the transmitting unit is further provided with a scrambler for scrambling the parallel signals to be furnished to the latch and the fixed delay portion, and the receiving unit is further provided with a descrambler for descrambling the parallel signals outputted from the variable delay portion.

3. The parallel signal transmission device as claimed in claim 2 wherein the latch resets the scrambler at a timing the latch latches the parallel signals, and the bit shift detector resets the descrambler at a timing the bit shift detector performs skew adjustments to the variable delay portion.

4. The parallel signal transmission device as claimed in claim 1 wherein a parallel number in the parallel signals comprises a prime number.

5. The parallel signal transmission device as claimed in claim 1 wherein a parallel number in the parallel signals and a bit number at a sampling interval latched by the latch are mutually in a prime relationship in a prime relationship.

6. The parallel signal transmission device as claimed in claim 1 wherein the bit shift detector has a detecting unit for detecting the bit shift amounts of the parallel signals from the synchronizing signals by performing a code matching between the serial code signals paralleled and parallel signals outputted from the bit changeover portion.

7. The parallel signal transmission device as claimed in claimed 6 wherein the bit shift detector has a code matching unit for performing the code matching using windows of a predetermined bit number based on the synchronizing signals, and the predetermined delay time of the fixed delay portion comprises a phase adjustment time for the windows.

8. The parallel signal transmission device as claimed in claim 1 wherein the bit shit detector detects the bit shift amounts of the parallel signals in a predetermined stage of forward and backward protection units.

9. The parallel signal transmission device as claimed in claim 8 wherein the bit shift detector has a determining unit for determining a synchronization established state where the bit shift amounts are detected only when a protection is established by only one of the protection units.

10. The parallel signal transmission device as claimed in claim 9 wherein the bit shift detector has a prohibiting unit for prohibiting the code matching at timings other than timings of synchronizing signals when the synchronization established state is obtained.

11. The parallel signal transmission device as claimed in claim 9 wherein the bit shift detector has a clearing unit for clearing the protection units of the corresponding parallel signals when the synchronization established state is not obtained.

12. The parallel signal transmission device as claimed in claim 1 wherein the bit shift detector has a warning unit for generating a warning when the synchronization established state is not obtained for a predetermined time.

* * * * *